United States Patent
Abuelsaad et al.

(10) Patent No.: US 8,826,156 B2
(45) Date of Patent: *Sep. 2, 2014

(54) CONTAINING AND ACCESSING MULTIPLE WEB BROWSERS

(75) Inventors: Tamer E. Abuelsaad, Poughkeepsie, NY (US); Kelly Aymar, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/607,937

(22) Filed: Sep. 10, 2012

(65) Prior Publication Data

US 2013/0007642 A1 Jan. 3, 2013

Related U.S. Application Data

(63) Continuation of application No. 11/770,305, filed on Jun. 28, 2007, now Pat. No. 8,321,798.

(51) Int. Cl.
*G06F 3/00* (2006.01)

(52) U.S. Cl.
USPC .......................................................... 715/760

(58) Field of Classification Search
None
See application file for complete search history.

(56) References Cited

U.S. PATENT DOCUMENTS

| | | | |
|---|---|---|---|
| 5,956,720 A | 9/1999 | Fernandez et al. | |
| 5,987,480 A | 11/1999 | Donohue et al. | |
| 6,076,166 A | 6/2000 | Moshfeghi et al. | |
| 6,304,886 B1 | 10/2001 | Bernardo et al. | |
| 6,351,772 B1 | 2/2002 | Murphy et al. | |
| 6,353,448 B1 | 3/2002 | Scarborough et al. | |
| 6,748,418 B1 | 6/2004 | Yoshida et al. | |
| 6,904,408 B1 | 6/2005 | McCarthy et al. | |
| 7,818,681 B2 | 10/2010 | Abuelsaad et al. | |
| 2003/0028764 A1 | 2/2003 | Campbell | |
| 2003/0051039 A1 | 3/2003 | Brown et al. | |
| 2005/0246444 A1 | 11/2005 | Koehane et al. | |
| 2006/0161503 A1 | 7/2006 | Popescu et al. | |
| 2007/0240098 A1 | 10/2007 | Averett et al. | |
| 2007/0271505 A1 | 11/2007 | Dandekar et al. | |

(Continued)

OTHER PUBLICATIONS

"BrowserTraySwitch," by DonationCoder.com (2005). Available at: http://www.donationcoder.com/Software/Mouser/browsertray/ Web Archive version: http://web.archive.org/web/20050514092346/http://www.donationcoder.com/Software/Mouser/browsertray/.*

(Continued)

*Primary Examiner* — Daniel Kinsaul
(74) *Attorney, Agent, or Firm* — Schmeiser, Olsen & Watts, LLP; Mark C. Vallone

(57) ABSTRACT

A method and system for displaying a web page. Each record in a container browser includes a web site locator of a web site and a web browser identifier of a web browser associated with the web site. A first web browser retrieves and displays a particular web page from a first web site. A user desires to replace a web browser identifier of a first web browser in a first record in the container browser with a web browser identifier of a second web browser. The web browser identifier of the second web browser is received from the user. The web browser identifier of the first web browser is replaced by the web browser identifier of the second web browser in the first record. The second web browser retrieves and displays the particular web page from the first web site.

18 Claims, 6 Drawing Sheets

(56) References Cited

U.S. PATENT DOCUMENTS

2008/0178113 A1 7/2008 Headrick et al.
2008/0301562 A1 12/2008 Berger et al.
2009/0006361 A1 1/2009 Abuelsaad et al.
2009/0049391 A1 2/2009 Abuelsaad et al.

OTHER PUBLICATIONS

Office Action (Mail Date Dec. 11, 2009) for U.S. Appl. No. 11/839,675, filed Aug. 16, 2007.
Amendment filed Mar. 11, 2010 in response to Office Action (Mail Date Dec. 11, 2009) for U.S. Appl. No. 11/839,675, filed Aug. 16, 2007.
Notice of Allowance (Mail Date Jun. 10, 2010) for U.S. Appl. No. 11/839,675, filed Aug. 16, 2007.
"Sizzling HTML Jalfrezi—F Tags—frames," available at http://www.htmlbyexample.com/frames/ff.htm. Last visited Dec. 3, 2009 Screenshots provided, and retrieved from the Web Archive for 2004. (as cited on PTO-892 of U.S. Appl. No. 11/839,675).
Lunascape ver. 1.3.3, by Kondo (2004) (screenshots provided in pdf format). Program available at http:/ldownloaded.cnet.com/Lunascape/3000-2356_4-1031 0739. html Last visited Jun. 16, 2009. (as cited on PTO-892 of U.S. Appl. No. 11/770,305).
IE Tab_Internet Explorer in Mozilla Firefox—the Freeware Review, (Jan. 24, 2006). Available at: http://www.freewareview.info/2006-01/ie_tab_internet_explorer_in_mozilla_firefox.html Last Visited: May 20, 2010 (as cited on PTO-892 of U.S. Appl. No. 11/770,305).
IE 6 Example, Screenshots of Operation of IE 6 from Examiner computer. (as cited on PTO-892 of U.S. Appl. No. 11/770,305).
Office Action (Mail Date Jun. 25, 2009) for U.S. Appl. No. 11/770,305, filed Jun. 28, 2007.
Amendment filed Jul. 24, 2009 in response to Office Action (Mail Date Jun. 25, 2009) for U.S. Appl. No. 11/770,305, filed Jun. 28, 2007.
Office Action (Mail Date Nov. 19, 2009) for U.S. Appl. No. 11/770,305, filed Jun. 28, 2007.
Amendment filed Feb. 19, 2010 in response to Office Action (Mail Date Nov. 19, 2009) for U.S. Appl. No. 11/770,305, filed Jun. 28, 2007.
Final Office Action (Mail Date May 21, 2010) for U.S. Appl. No. 11/770,305, filed Jun. 28, 2007.
Amendment and Request for Continued Examination (RCE) filed Jul. 20, 2010 in response to Final Office Action (Mail Date May 21, 2010) for U.S. Appl. No. 11/770,305, filed Jun. 28, 2007.
Office Action (Mail Date Feb. 6, 2012) for U.S. Appl. No. 11/770,305, filed Jun. 28, 2007.
Amendment filed May 7, 2012 in response to Office Action (Mail Date Feb. 6, 2012) for Patent Application No. 11/770,305, filed Jun. 28, 2007.
Notice of Allowance (Mail Date Jul. 18, 2012) for U.S. Appl. No. 11/770,305, filed Jun. 28, 2007.

\* cited by examiner

700

| Patent Office | www.USPTO.gov | Browser 1 |
| Patent Attorney | www.Dwlaw.com | Browser 2 |
| Amusement Park | www.Park.com | Browser 3 |
| Grade School | www.the_academy.com | Browser 4 |

CONTAINING AND ACCESSING MULTIPLE WEB BROWSERS

This application is a continuation application claiming priority to Ser. No. 11/770,305, filed Jun. 28, 2007.

FIELD OF THE INVENTION

This invention relates to a method and system for containing in one computer resource. More particularly, this invention relates to a method and system for storing a set of web browsers in one computing resource and accessing a selected web browser to retrieve and display a specific web page wherein the selected web browser provides the optimum display quality from the set of browsers contained in the computing resource for the selected web page.

BACKGROUND OF THE INVENTION

A Web browser is a software application that enables a user to display and interact with text, images, and other information typically located on a Web page at a website on the World Wide Web or a local area network. Text and images on a Web page can contain hyperlinks to other Web pages at the same or different website. Web browsers allow a user to quickly and easily access information provided on many Web pages at many websites by traversing these links. Web browsers format HTML information for display, so the appearance of a Web page may differ between browsers. Web browsers communicate with Web servers primarily using HTTP (hypertext transfer protocol) to retrieve webpages. A web server is a computer program that is responsible for accepting HTTP requests from clients, which are known as Web browsers, and serving them HTTP responses along with optional data contents, which usually are Web pages such as HTML documents and linked objects (images, etc.).

A Web page or web page is a resource of information that is suitable for the World Wide Web and can be accessed through a web browser. This information is usually in HTML or XHTML format, and may provide navigation to other web pages via hypertext links. Web pages may be retrieved from a local computer or from a remote web server. The web server may restrict access only to a private network, e.g. a corporate intranet, or it may publish pages on the World Wide Web. Web pages are requested and served from web servers using Hypertext Transfer Protocol (HTTP). A web page is a type of web document. Web pages may consist of files of static text stored within the web server's file system (static web pages), or the web server may construct the (X)HTML for each web page when it is requested by a browser (dynamic web pages). Client-side scripting can make web pages more responsive to user input once in the client browser.

With the constant emergence of new website content display technologies, not all web browsers are able to render their content as originally intended by the web site's author. Many web browsers rely on plugins to display web content properly. Consequently, a user's visual representation of web site between one browser and another can look very different depending on what that browser has the capability to render. A common phrase seen on some web sites is the phrase "this content is best viewed in Internet Explorer".

As an example, the United States Patent and Trademark Office website (www.uspto.gov) displays images of patents. However, not all web browsers can adequately display these patent images. Therefore for a user to access the patent office web site and view the display images of the patents a user would need to be aware of the browser that the can best display the patent images. The user would need to access the website through the browser that best displays these pages.

The need to continually track the display capabilities of a web browser with regard to displaying particular web pages can be a source of frustration for the user. This presents a level of frustration to the user. Having to keep switching web browsers and remembering which site looks and works best in which browser needs to be addressed. There remains a need for a super browser wherein a user could launch a selected web browser through which a web page would be displayed. This container browser could track the browsers and retrieve the browser to be used to best view a website.

SUMMARY OF THE INVENTION

The present invention describes a container browser, or a super browser, from which a user can launch any web browser to display a web page. This container browser can track and bookmark the browsers such that the browsers could be easily selected and initiated. The container browser could be an application program that could be internally launched within any web browser, such as brand name web browsers (Internet Explorer, Firefox. Netscape, etc. . . . ). The container browser could present the content in tabbed form, meaning that a tab that the user can click on will represent every open window. Each tab must contain the website title as well as an icon to represent the web browser that it is being viewed in.

Identifying web sites for inclusion in the container web browser is done in a different way than conventional methods. When a user goes to a tab and chooses to identify or mark a particular web browser, the container browser creates an internal entry to the container browser. This entry can contain the website name, URL for the website, and the particular web browser through which the web site can be viewed. The user can alter all these features in a container browser entry at any given time through a management interface. When the user goes to retrieve a specified browser, the container browser opens a tab and views the site with the stored web browser. The container browser can be smart enough to detect web browsers installed in a web site as well as allow for the user to specify a web browser path.

In the present invention, the method for retrieving a web site browser through which to display a website involves identifying a web browser for a desired website by determining whether the accessed web site is currently included in the container browser. If it is included, then the user is queried to determine if the user desires to make changes to the stored information. A change could be to select another browser through which the user desires to display a website. If the web site does not have an entry in the container browser, then the user is queried to select a preferred browser to display the particular web page. When the user selects a website, the method creates a record or entry containing information about that browser and associating that browser with the particular web site.

DETAILED DESCRIPTION OF THE INVENTION

The present invention provides a method and system for marking web browsers to be associated with specific web sites. The marked web browsers will be used to view the associated web site. The intent of this concept is to provide a web browser that more optimally displays the specified web site.

Figure 1:
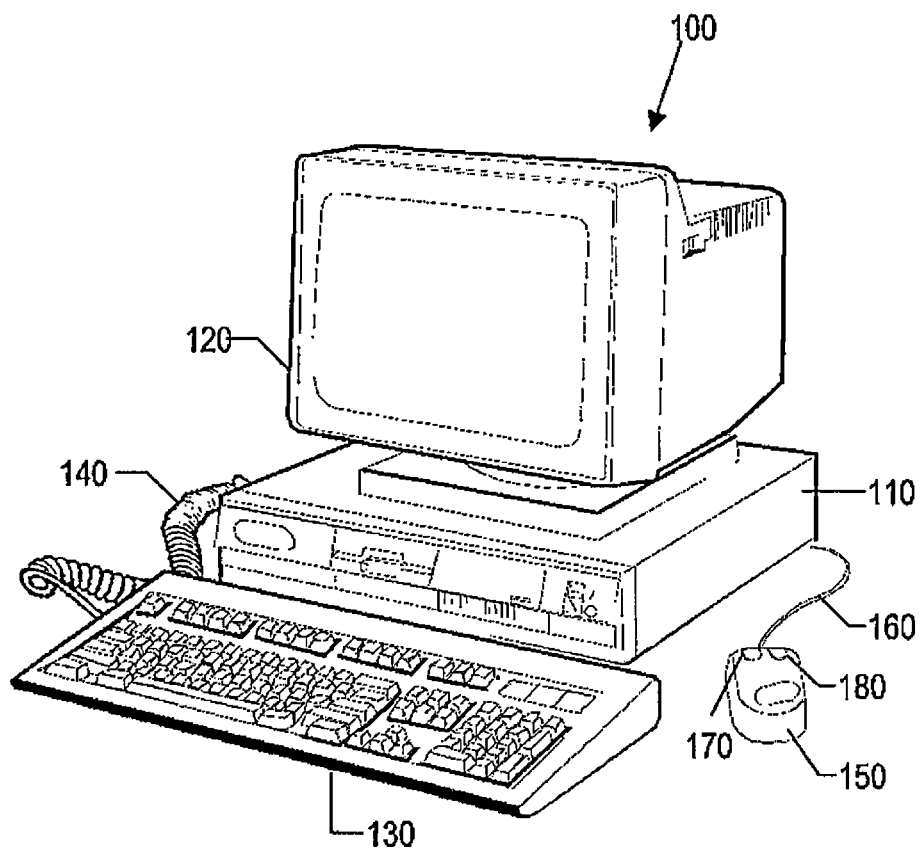
FIG. 1 is a pictorial representation of a personal computing device, which may be used in implementation of the present invention.

With reference now to FIG. 1, there is depicted a pictorial representation of a data processing system that includes computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, computing device 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150. Mouse 150 is coupled to processor 110, in a manner well known in the art, via cable 160. As is shown, mouse 150 may include left button 170, and right button 180, each of which may be depressed, or "clicked", to provide command and control signals to computing device 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that computing device 100 may be implemented utilizing a personal computer.

Figure 2:
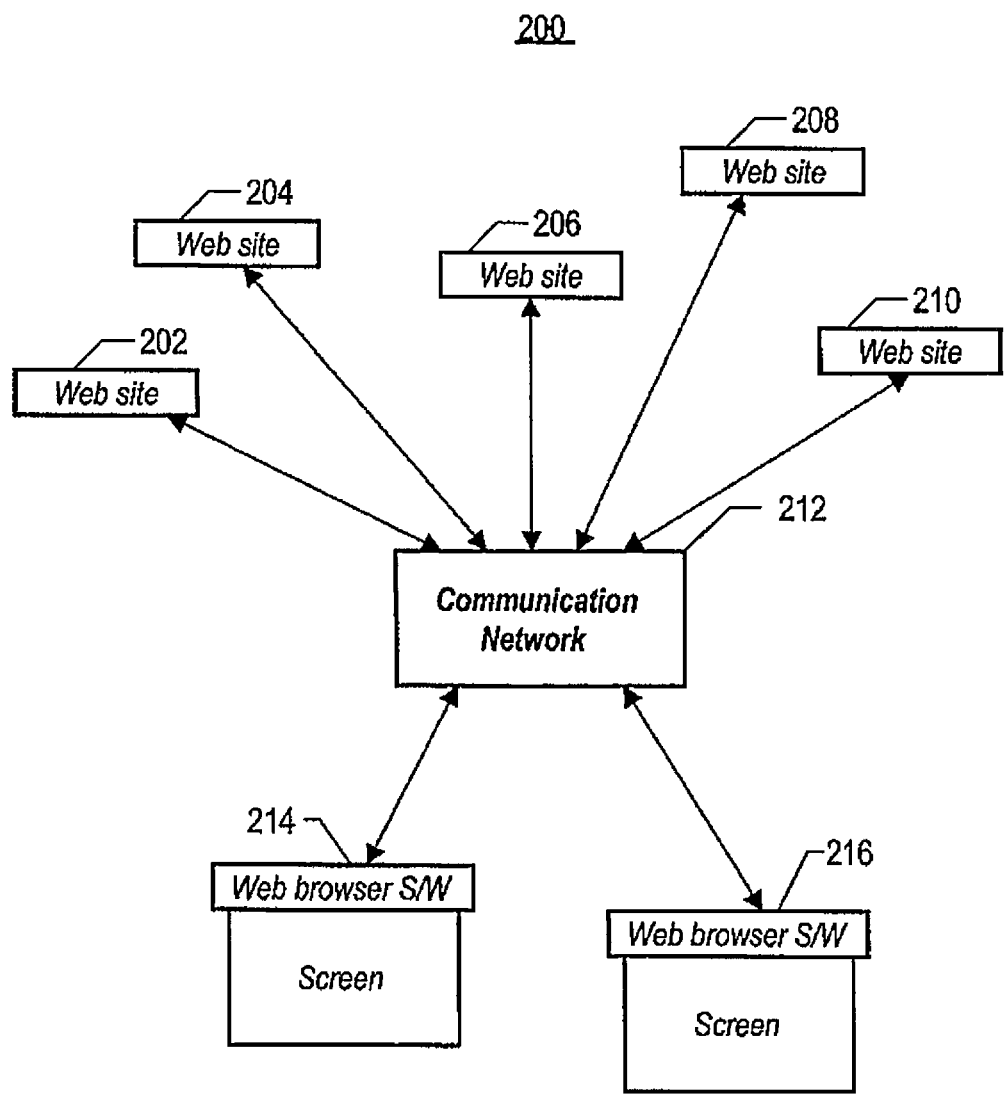
FIG. 2 is a display of a general configuration of the connection patterns for communication network, which includes web sites and users that can view the web sites through web browsers.

FIG. 2 is an illustration of a communication network configuration through which a user can access and display a website. Shown is a network 200 that contains several websites (202, 204, 206, 208 and 210). As previously discussed, a web page is a resource of information that exists on a communication network 212 such as the Internet or World Wide Web and can be accessed through a web browser 216. The computing device 100 (see FIG. 1) contains a software browser program. When activated, the browser program establishes communications with a web page viewed through the communication network. In most applications, the initial or default web page comes when a user initially establishes a connection to the communication network. This web page is usually associated with a default web browser for that user.

Figures 3, 7:
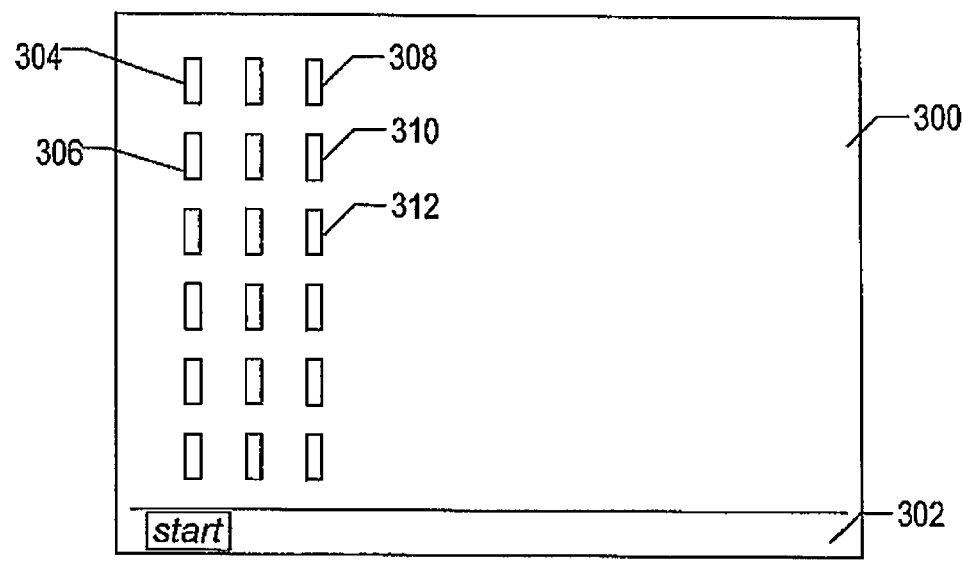
FIG. 3 is a display of a computer device screen or desk top that contains various icons used to activate various programs on the computing device including used to activate web site browsers from the computer device.
FIG. 7 is a set of records created and contained in accordance with the present invention that contains information including a web site name, web site URL and a web browser for displaying the web site.

FIG. 3 is an illustration of a conventional computing device video display or computer screen 300. This screen has a bottom display section 302 that displays various command options. In this example, clicking the 'start' icon produces a list of commands from which the user can select. The main portion of the screen also contains several icons such as 304, 306, 308, 310 and 312. These icons can provide access and activation of several application programs stored in the computing device. Icons 304, 306, 308, 310 and 312 can activate web browser programs stored on the computing device. The clicking of a web browser can establish access to the communication network. In conventional processes, when this occurs, any web page is opened in that browser. With the present invention, clicking any browser icon could activate the container browser. The initial or default browser page could be one associated with the container browser or could be another default browser that the user can specify.

Figure 4:
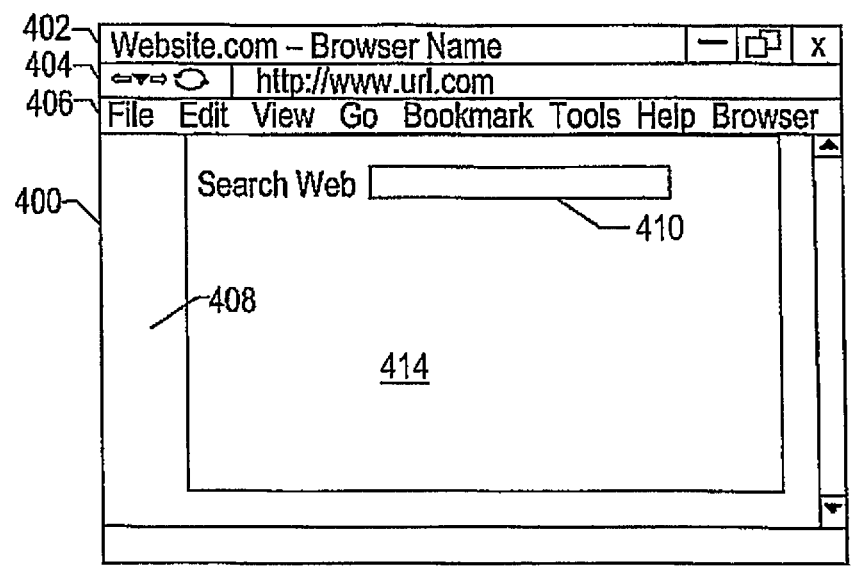
FIG. 4 is a web site screen in accordance with the present invention displaying a browser option that can allow a user to designate a specific web browser through which the user desires to view the web site.

FIG. 4 shows a web page 414 of the present invention incorporating the container browser concept of the present invention. Similar to many computer screen displays for application programs, screen 400 contains are several lines of information and options. Line 402 has information tells the name of the web site and the name of the browser through which the web site is displayed. Line 404 has option icons '←' and '→' that enable a user to scroll back to previous web sites or forward to other web sites. In addition, line 404 also contains a locator of the Uniform Resource Locator "URL" for the current web site that is displayed on the screen. Line 406 contains icons that indicate various commands that the user can perform. One of these commands can be a 'Browser' command that activates the container browser program. The display can contain a section 408 with links to other web sites. The web page 414 also contains a search option 410. This search feature enables the user to search for other web sites based on search criteria this is included in the search space.

Figure 5:
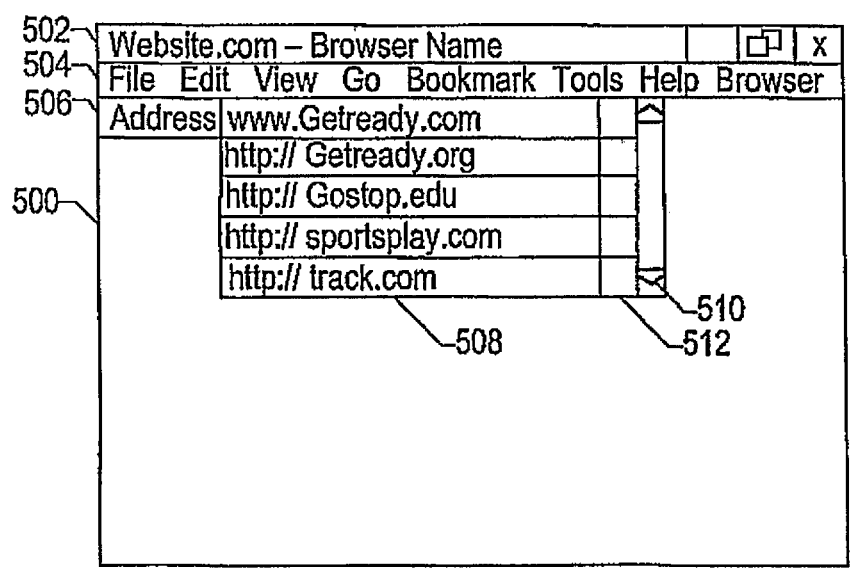
FIG. 5 is a web site screen in accordance with the present invention displaying a browser option and a drop down listing of websites, with each web site having a designated web browser through which a user can view the web site.

FIG. 5 illustrates a list of stored of web pages stored in a container browser in accordance with the present invention. As shown, the computer screen contains a default web page 500 that the user sees when the computer device 100 (see FIG. 1) is initially connected to the communication network via a default browser. The web page contains the previously discussed information lines 502, 504 and 506. Line 506 contains the address or URL of the default web page (the initial web page that comes up when initially connected to the communication network). Clicking an accessed web sites icon of the down arrow 510 can produce the pull down display 508 containing a list of websites that have been accessed by the user. This list of websites could also be from a set of web sites that are stored in the container browser. The container browser will contain a list of marked websites and the preferred browser to display the web site contents. The list contains the URL for a web site and the designated web browser for each web site in field 512.

Figure 6:
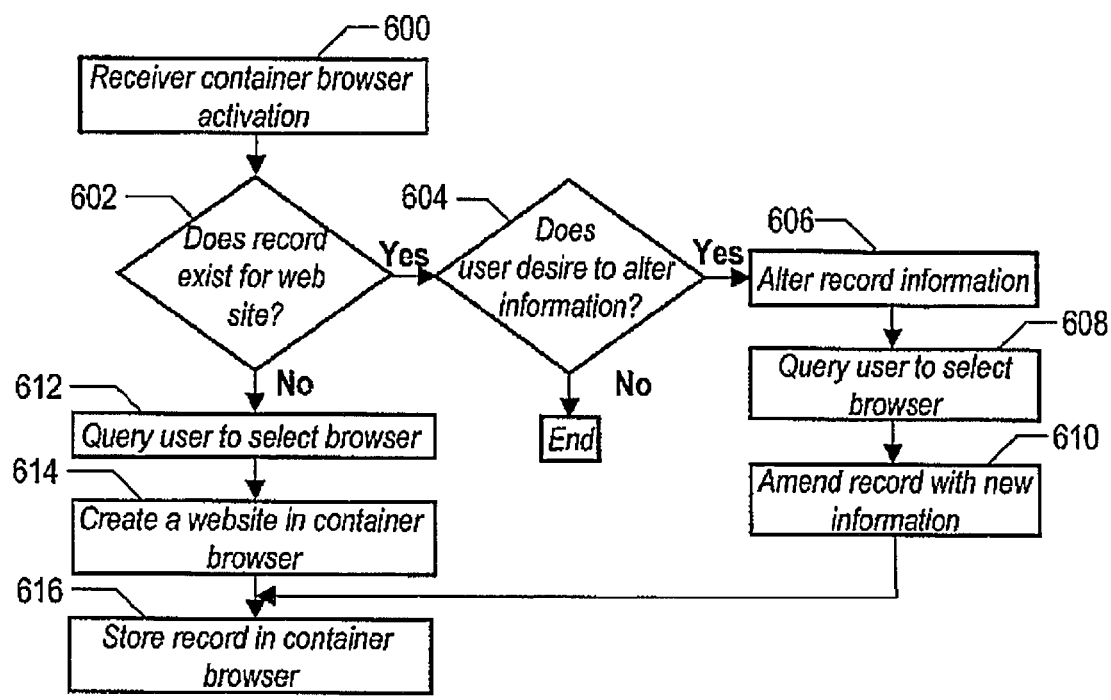
FIG. 6 is a flow diagram of the steps involved in designating a specific browser through which a user can view a website.

The method of the invention has two aspects. The initial aspect of the method is to establish a specific browser to display a specific web site. FIG. 6 is a flow diagram of the steps involved in designating a specific browser through which a user can view a website. The initial step in this method is to activate the container browser, step 600. Referring to FIG. 4, this activation can be by clicking the 'Browser' icon in line 406. Clicking this icon sends a signal that initializes this method implemented by the container browser program. This activation will occur when a web site is currently being displayed on the computer screen. At this point, step 602 determines whether a record already exists for that web site in the container browser. If the determination is that there is that a record does exist for that web site, then step 604 determines whether the user wants to alter information contained in the record for that web site. The user may have installed an additional web browser and now wants to display the web site on that newly installed browser. Step 606 begins the process of altering the record information. Step 608 sends a query to the user to select a browser from the list of available browsers on the system. Once the user has selected the new browser, step 610 amends the existing record for that web site with the new information. This amended record is then stored in the container browser in step 616.

Referring back to step 602, if the determination is that a record does not exist in the container browser for the current web site, then the method moves to step 612 where the user is queried to select a web browser. At this point, the user would select a web browser from a list of available browsers. In some systems, the selected web browser made not be available. The desired browser may not be installed on that system. In this case, the user can be prompted to have the desired browser installed or to select one of the already installed browsers. Once the user has selected a web browser, step 614 creates a record in the web site container for that web site. This created record is then stored in the container browser for that site.

FIG. 7 is a set of records 700 created and contained in the container browser storage location. These records contain three fields. The first field 702 describes the name of the web site. The second field 704 contains the URL for the web site. The third field 706 contains the specific and designated web browser to display that web site. These record entries can exist for each site that a user accesses or just for the web sites that the user designates.

Figure 8:
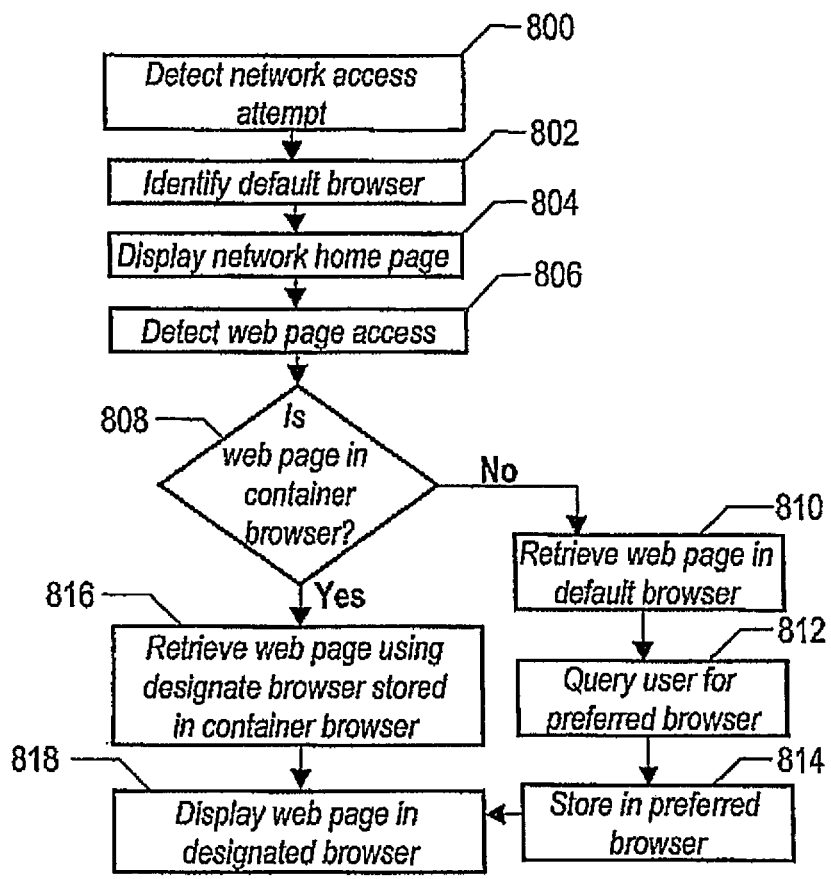
FIG. 8 is a flow diagram of the steps involved in retrieving a web page in accordance with the present invention.

FIG. 8 describes the second aspect of the method of the present when a user desires to display a web page. In this method, in step 800, there is an initial detection of a user's attempt to establish a connection with a communication network. This initial access attempt is made through some browser software on the computing device. As part of this connection, an initial or default web page is display on the computer device screen. This initial page can be a default page of the browser software. Many browsers allow the user to change the initial web page if they prefer. Step 802 identifies an initial or default browser. The user can designate the container browser as the default browser. Therefore, when the user could click a desktop icon for the container browser to generate the connection attempt through the super browser. In other cases, the user may prefer a different default browser. Whichever browser the user chooses, the step 804 displays the initial home page for that browser.

At this point, the user has access to the communication network. Next, the user will attempt to open a specific web page on the network. There are various ways that a user has to access a web page. For example, the user can access the web page by inputting the URL for the web page or performing a search and accessing an entry from the search results. Step 806 detects this attempt to access the specific web page. This access attempt can also activate the container browser. Step 808 then identifies the web page that the user is attempting to access and determines whether this web page is also contained in the container browser. This identification process can be a matching of the web page URL with the URLs of entries stored in the container browser. If the determination is that the web page that the user is attempting to access is not already in the container browser, then method moves to step 810 which retrieves and displays the web sites in the default browser. Step 812 queries the user to give the user an opportunity to display the web page in a preferred browser. This step automatically initiates the process of establishing a specific browser for a specific web site similar to the process described in FIG. 6. If the user at this point prefers a specific browser, then that browser is identified and a record this web site with that browser is stored in the container browser. This method then moves to step 818, which displays the web page in the designated browser. In the alternative, the user may want to display the web page in a preferred browser, but does want to save this web site and preferred browser information in the container browser. In this case, the user can decline to store the browser information in step 814. Referring again to step 808, if the determination is that the web site is already stored in the container browser, then the process moves to step 816, which retrieves the web site using the preferred browser. At this point, step 818 displays the web page in the designated browser.

One point to note is that many web sites have multiple pages. For example, the patent office web site has links to many pages referred to as web pages with the web site. The present invention can also enable a user to designate a particular web page within the web site that can be displayed with a particular web browser.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for displaying a web page, said method comprising:

creating, by a processor of a computing device, a plurality of records in a container browser, each record comprising a web site locator of a web site and a web browser identifier of a web browser associated with the web site;

after said creating, said processor using a first web browser to retrieve a particular web page from a first web site and display the particular web page on a screen of a computing device;

responsive to said using the first web browser, said processor determining that a first record of the plurality of records exists in the container browser;

responsive to said determining that the first record exists in the container browser, said processor ascertaining that a user desires to replace a web browser identifier of a first web browser in the first record with a web browser identifier of a second web browser;

responsive to said ascertaining, said processor prompting the user to select the web browser identifier of the second web browser;

responsive to said prompting the user, said processor receiving the web browser identifier of the second web browser from the user;

responsive to said receiving the web browser identifier of the second web browser, said processor replacing the web browser identifier of the first web browser with the web browser identifier of the second web browser in the first record; and after said replacing, said processor using the second web browser identified by the web browser identifier of the second web browser in the first record to retrieve the particular web page from the first web site and display the particular web page on the screen of the computing device.

2. The method of claim 1, said method further comprising:
after said creating and before said determining that the first record exists in the container browser, said processor activating a container browser program,
wherein said container browser program performs:
  said determining that the first record exists in the container browser,
  said determining that the user desires to replace the web browser identifier of the first web browser in the first record in the container browser with the web browser identifier of the second browser,
  said prompting the user to select the second web browser,
  said receiving the web browser identifier of the second web browser, and
  said using the second web browser to retrieve the particular web page from the first web site and display the particular web page on the screen of the computing device.

3. The method of claim 2, said method further comprising:
wherein during said display of the particular web page of the first web site using the first web browser, the screen of the computing device displays a Browser icon;
wherein said method further comprises: after said retrieval and display of the particular web page of the first web site using the first web browser and before said activating the container browser program, said processor detecting that the Browser icon has been clicked; and
wherein said activating the container browser program is in response to said detecting that the Browser icon has been clicked.

4. The method of claim 3, wherein during said display of the particular web page of the first web site using the first web browser, the screen of the computing device comprises a single horizontal line that displays, at a same horizontal level, a totality of icons consisting of a File icon, an Edit, icon, a Go icon, a Bookmark icon, a Tools icon, a Help icon, and the Browser icon.

5. The method of claim 1, wherein each record in the container browser consists of a description of a name of the web site in a first field of each record, said web site locator of the web site in a second field of each record, and said web browser identifier of the web browser associated with the web site in a third field of each record, and wherein the first, second and third fields of each record are different fields of each record.

6. The method of claim 1, said method further comprising:
after said using the first web browser, said processor detecting a selection of an accessed web sites icon on the displayed particular web page; and
responsive to said detecting the selection of the accessed web sites icon, said processor generating, on the particular web page of the first web site, a pull down display that identifies the web sites in the container browser,
wherein each line of the pull down display corresponds to a record of the container browser, and
wherein each line of the pull down display consists of both said web site locator of the web site and said web browser identifier of the web browser associated with the web site.

7. A system comprising a computing device, said computing device comprising a processor, a memory coupled to the processor, and a computer readable storage device coupled to the processor, said storage device containing program code configured to be executed by the processor via the memory to implement a method for displaying a web page, said method comprising:
  said processor creating a plurality of records in a container browser, each record comprising a web site locator of a web site and a web browser identifier of a web browser associated with the web site;
  after said creating, said processor using a first web browser to retrieve a particular web page from a first web site and display the particular web page on a screen of the computing device;
  responsive to said using the first web browser, said processor determining that a first record of the plurality of records exists in the container browser;
  responsive to said determining that the first record exists in the container browser, said processor ascertaining that a user desires to replace a web browser identifier of a first web browser in the first record with a web browser identifier of a second web browser;
  responsive to said ascertaining, said processor prompting the user to select the web browser identifier of the second web browser;
  responsive to said prompting the user, said processor receiving the web browser identifier of the second web browser from the user;
  responsive to said receiving the web browser identifier of the second web browser, said processor replacing the web browser identifier of the first web browser with the web browser identifier of the second web browser in the first record; and
  after said replacing, said processor using the second web browser identified by the web browser identifier of the second web browser in the first record to retrieve the particular web page from the first web site and display the particular web page on the screen of the computing device.

8. The system of claim 7, said method further comprising:
after said creating and before said determining that the first record exists in the container browser, said processor activating a container browser program,
wherein said container browser program performs:
  said determining that the first record exists in the container browser,
  said determining that the user desires to replace the web browser identifier of the first web browser in the first record in the container browser with the web browser identifier of the second browser,
  said prompting the user to select the second web browser,
  said receiving the web browser identifier of the second web browser, and
  said using the second web browser to retrieve the particular web page from the first web site and display the particular web page on the screen of the computing device.

9. The system of claim 8, said method further comprising:
wherein during said display of the particular web page of the first web site using the first web browser, the screen of the computing device displays a Browser icon;
wherein said method further comprises: after said retrieval and display of the particular web page of the first web site using the first web browser and before said activating the container browser program, said processor detecting that the Browser icon has been clicked; and wherein said activating the container browser program is in response to said detecting that the Browser icon has been clicked.

10. The system of claim 9, wherein during said display of the particular web page of the first web site using the first web browser, the screen of the computing device comprises a single horizontal line that displays, at a same horizontal level, a totality of icons consisting of a File icon, an Edit, icon, a Go icon, a Bookmark icon, a Tools icon, a Help icon, and the Browser icon.

11. The system of claim 7, wherein each record in the container browser consists of a description of a name of the web site in a first field of each record, said web site locator of the web site in a second field of each record, and said web browser identifier of the web browser associated with the web site in a third field of each record, and wherein the first, second and third fields of each record are different fields of each record.

12. The system of claim 7, said method further comprising:
after said using the first web browser, said processor detecting a selection of an accessed web sites icon on the displayed particular web page; and
responsive to said detecting the selection of the accessed web sites icon, said processor generating, on the particular web page of the first web site, a pull down display that identifies the web sites in the container browser,
wherein each line of the pull down display corresponds to a record of the container browser, and
wherein each line of the pull down display consists of both said web site locator of the web site and said web browser identifier of the web browser associated with the web site.

13. A computer program product, comprising a computer readable hardware storage device having computer readable software code stored therein, said software code which upon being executed by a processor of a computing device implements a method for displaying a web page, said method comprising:
said processor creating a plurality of records in a container browser, each record comprising a web site locator of a web site and a web browser identifier of a web browser associated with the web site;
after said creating, said processor using a first web browser to retrieve a particular web page from a first web site and display the particular web page on a screen of the computing device;
responsive to said using the first web browser, said processor determining that a first record of the plurality of records exists in the container browser;
responsive to said determining that the first record exists in the container browser, said processor ascertaining that a user desires to replace a web browser identifier of a first web browser in the first record with a web browser identifier of a second web browser;
responsive to said ascertaining, said processor prompting the user to select the web browser identifier of the second web browser;
responsive to said prompting the user, said processor receiving the web browser identifier of the second web browser from the user;
responsive to said receiving the web browser identifier of the second web browser, said processor replacing the web browser identifier of the first web browser with the web browser identifier of the second web browser in the first record; and after said replacing, said processor using the second web browser identified by the web browser identifier of the second web browser in the first record to retrieve the particular web page from the first web site and display the particular web page on the screen of the computing device.

14. The computer program product of claim 13, said method further comprising:
after said creating and before said determining that the first record exists in the container browser, said processor activating a container browser program,
wherein said container browser program performs:
said determining that the first record exists in the container browser,
said determining that the user desires to replace the web browser identifier of the first web browser in the first record in the container browser with the web browser identifier of the second browser,
said prompting the user to select the second web browser,
said receiving the web browser identifier of the second web browser, and
said using the second web browser to retrieve the particular web page from the first web site and display the particular web page on the screen of the computing device.

15. The computer program product of claim 14, said method further comprising:
wherein during said display of the particular web page of the first web site using the first web browser, the screen of the computing device displays a Browser icon;
wherein said method further comprises: after said retrieval and display of the particular web page of the first web site using the first web browser and before said activating the container browser program, said processor detecting that the Browser icon has been clicked; and
wherein said activating the container browser program is in response to said detecting that the Browser icon has been clicked.

16. The computer program product of claim 15, wherein during said display of the particular web page of the first web site using the first web browser, the screen of the computing device comprises a single horizontal line that displays, at a same horizontal level, a totality of icons consisting of a File icon, an Edit, icon, a Go icon, a Bookmark icon, a Tools icon, a Help icon, and the Browser icon.

17. The computer program product of claim 13, wherein each record in the container browser consists of a description of a name of the web site in a first field of each record, said web site locator of the web site in a second field of each record, and said web browser identifier of the web browser associated with the web site in a third field of each record, and wherein the first, second and third fields of each record are different fields of each record.

18. The computer program product of claim 13, said method further comprising:
after said using the first web browser, said processor detecting a selection of an accessed web sites icon on the displayed particular web page; and
responsive to said detecting the selection of the accessed web sites icon, said processor generating, on the particular web page of the first web site, a pull down display that identifies the web sites in the container browser,
wherein each line of the pull down display corresponds to a record of the container browser, and wherein each line of the pull down display consists of both said web site locator of the web site and said web browser identifier of the web browser associated with the web site.

* * * * *